UNITED STATES PATENT OFFICE.

MORDUCH L. KAPLAN, OF BROOKLYN, NEW YORK, ASSIGNOR TO BEACON MINIATURE ELECTRIC CO., INC., OF NEW YORK, N. Y., A CORPORATION OF NEW YORK.

GALVANIC CELL.

1,170,819.      Specification of Letters Patent.      Patented Feb. 8, 1916.

No Drawing.      Application filed May 1, 1915. Serial No. 25,165.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

This invention relates to galvanic cells (of the Leclanche type) consisting of a negative zinc pole, a positive carbon pole, an electrolyte containing ammonium chlorid or other ammonium salts, and the like and a depolarizing mass comprising powdered graphite or other form of conducting carbon, incorporated with an oxid of manganese of novel character and high efficiency as a depolarizing agent and relates in particular to a depolarizing material comprising particles of conducting carbon and associated manganese bodies as more particularly hereinafter described in detail and set forth in the appended claims.

The present form of galvanic cells of the Leclanche type, as is well known, consists of a negative zinc pole, a positive carbon pole, an electrolyte containing ammonium chlorid or other ammonia salt, and a depolarizing mass consisting of a mere mixture of powdered graphite or other form of carbon, with a higher oxid of manganese, such as manganese peroxid, $MnO_2$. Pulverized natural manganese peroxid, as for example, the mineral pyrolusite, commonly has been used for this purpose, although an artificial form of the hydrated peroxid, obtained by its precipitation by reagents from solutions of manganese compounds, also has been employed to some extent. It is difficult to grind the natural mineral manganese material to as fine a degree as is desired, and the precipitated manganese material, although finely-divided, is commonly very bulky; due no doubt in part at least to its water of hydration, so that depolarizing material in sufficient quantity can scarcely be crowded into the small space available for the depolarizing element. Furthermore the hydrate water lowers the percentage of active oxygen.

Manganese peroxid, substantially or essentially free of hydrate water and of a very desirable high specific gravity, can be obtained by heating manganese nitrate to about 160° C. Although rich in active oxygen, the baking operation produces lumps which are difficult to pulverize or to put into condition to afford any real or intimate contact of the depolarizing and conducting material.

Attempts have been made to secure a more intimate contact of the depolarizing material and the conducting body and to improve the relatively low efficiency of the cell in the case of a depolarizing mass consisting of a mere mixture of powdered graphite or other form of carbon with pre-formed or ordinary manganese peroxid. It has even been proposed to impregnate a porous carbon electrode with a solution of a manganese compound, such as manganese nitrate, and to then heat to a sufficient temperature to decompose this material and drive off the acid, thus leaving the carbon rod or structure more or less coated with manganese peroxid wherever the solution comes in contact with the carbon surface during the heating operation. While in some measure an increase in the efficiency is possibly derived by such treatment, it is difficult to secure a sufficient amount of deposited manganese peroxid in contact with the conducting material under such conditions as to obtain uniform depolarization and conductivity, while using such quantity of the peroxid as to afford the desired life to the cell. Although when using electrolytes consisting of certain salts such as potassium or zinc chlorid it is possible under these conditions to obtain a fair output, it is well known that these electrolytes are not of a very satisfactory character when used in dry cells and in the case of an electrolyte the active component of which is largely or wholly ammonium chlorid, the resulting action with such impregnated carbon structure is not of a character always to afford satisfactory commercial results. The precipitation of manganese peroxid on the bulky porous mass of carbon to secure any degree of uniformity of decomposition is a matter of extreme difficulty and the irregular deposition of the peroxid leads to low efficiency because the carbon in some parts has an insufficient amount of depolarizing material, while in other parts there may be even an excess of this agent. If however, the graphite or other form of carbon used as conducting material, is introduced into a solution of manganese nitrate and evaporated to dryness with stirring and heated to a temperature of 170° C., dense manganese peroxid is deposited in intimate contact with and coating the carbon particles. After all red fumes of oxids of nitrogen have disappeared, the residue is boiled with water, collected on filters, thoroughly washed with water, and dried.

The quantity of graphite or other form of carbon which is added to the solution of manganese nitrate is preferably sufficient to give the right proportion of manganese peroxid to pulverized conducting material. The latter is usually present in amount in excess of the former. This method of formation and deposition or precipitation yields the depolarizing material in substantial electrical contact with the particles of graphite, and after being moistened with an electrolyte the peroxid-coated particles are in readiness for forming into the desired shape around a rod or pencil of carbon.

The pencil of carbon with its enveloping mass of formed depolarizer consisting of or comprising the manganese material deposited on and about the graphite particles is wrapped in a tissue such as cloth and is placed in a zinc container forming the negative pole and which also serves to hold a gelatinous vehicle or paste containing the electrolyte or exciting liquid, ordinarily comprising ammonium chlorid.

From the foregoing it will be seen that my invention comprises a depolarizer of novel organization having its components so coordinated as to yield a maximum of electrical efficiency and cell longevity.

The invention is especially adapted for use with an electrolyte, the active component of which is ammonium chlorid as manganese peroxid coated on discrete particles of carbon as herein set forth apparently is peculiarly reactive with this exciting agent. The extraction with acidulated water seemingly tends to open the pores of the dense depolarizing material so that penetrability of electrolyte conjoined with compactness is obtained. This is important from the standpoint of reactivity and conductivity. Thus it becomes possible to use a prepared manganese depolarizer of a density heretofore thought to be unfeasible thereby enabling the production of that very compact form of dry cell, known as miniature, which is used very largely for making pocket flashlights and the like and which necessarily must have high depolarizing efficiency in order to secure the continuous satisfactory performance of the cell. A further desirable function of the manganese coating is its agglomerating action with respect to graphite. The particles of the latter are of an "unctous" nature and bond with difficulty but when more or less coated with manganese peroxid in the state of intimate contact secured by the present invention the mass may be shaped without difficulty and a coherent stable molded mass obtained in which the graphite particles are firmly held. Furthermore it becomes possible to distribute the manganese material with a high degree of uniformity throughout such shaped mass as each particle of graphite may carry its quota of manganous polymanganite, manganese peroxid, simple manganites, higher oxid of manganese, or other similar agent employed and no trouble arises from irregular distribution thereof and consequent lack of efficiency. Again by precipitation in the manner herein set forth, or by equivalent procedure, the manganese material is in true electrical contact with the graphite or other carbon particles as distinguished from the mere mixture of these two substances; for in the latter case only haphazard contact is secured and such mechanical mixtures are often lacking in uniformity as the difference in gravity in handling when preparing the depolarizing mass not infrequently leads to an undesirable segregation of the components. In its preferred form the material employed in the present invention is substantially not affected in this manner and hence the derived cell is free from the stated objectionable features characteristic of the cruder types heretofore suggested.

What I claim is:—

1. As a new article of manufacture, a depolarizing material comprising discrete particles of graphite coated with higher oxid of manganese.

2. As a new article of manufacture, a shaped depolarizing material comprising discrete particles of graphite bonded by attached dense but slightly porous manganese depolarizing material.

Signed at New York city, in the county of New York, and State of New York, this 28th day of April, A. D. 1915.

MORDUCH L. KAPLAN.

Witnesses:
ARTHUR MARION,
CHAS. C. GILL.